United States Patent Office 3,776,911
Patented Dec. 4, 1973

3,776,911
2-AMINO-5-OXO-5,6-DIHYDRO-s-TRIAZOLO
[1,5-c]PYRIMIDINES
Gilbert Joseph Stacey, Macclesfield, England, assignor to Imperial Chemical Industries Limited, London, England
No Drawing. Continuation-in-part of abandoned application Ser. No. 22,047, Mar. 23, 1970. This application Nov. 2, 1971, Ser. No. 195,048
Claims priority, application Great Britain, Apr. 17, 1969, 19,635/69
Int. Cl. C07d 51/46
U.S. Cl. 260—256.4 F                    7 Claims

ABSTRACT OF THE DISCLOSURE

5 - oxo-5,6-dihydro-s-triazolo[1,5-c]pyrimidine derivatives bearing an amino or substituted amino group in the 2-position, an alkyl or aralkyl group in the 6-position, an alkyl group in the 8-position, and optionally, an alkyl group in the 7-position, for example, 2-amino-5,6-dihydro - 5 - oxo-6,8-di-n-propyl-s-triazolo[1,5-c]pyrimidine. These compounds are effective in preventing bronchospasm and can be used in the treatment of asthma.

---

This application is a continuation-in-part of Ser. No. 22,047, filed Mar. 23, 1970 and now abandoned.

This invention relates to heterocyclic compounds and in particular it relates to triazolo-pyrimidine derivatives which are capable of preventing bronchospasm and are therefore useful in the treatment of diseases which involve spasm or constriction of the bronchial musculature, for example asthma or bronchitis.

According to the invention there is provided a triazolo-pyrimidine derivative of the formula:

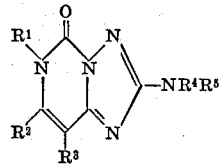

(I)

wherein $R^1$ stands for an alkyl radical of 1–6 carbon atoms or an aralkyl radical of up to 10 carbon atoms, $R^2$ stands for hydrogen or an alkyl radical of 1–3 carbon atoms, $R^3$ stands for an alkyl radical of 1–6 carbon atoms, $R^4$ stands for hydrogen or a radical of the formula $R^6$.CO—, wherein $R^6$ stands for an alkyl or alkoxy radical of 1–4 carbon atoms, and $R^5$ stands for hydrogen or an alkyl radical of 1–6 carbon atoms.

The triazolo-pyrimidine derivatives of the invention have the ring structure set out above, i.e. s-triazolo-[1,5-c]pyrimidine, which is numbered as shown below:

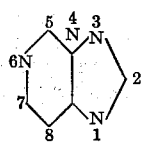

A particularly suitable value for $R^1$ is, for example, a methyl, n-propyl or benzyl radical, and a particularly suitable value for $R^2$ is hydrogen or a methyl radical. A particularly suitable value for $R^3$ or for $R^6$ or $R^5$, when it stands for an alkyl radical, is, for example, a methyl, ethyl, n-propyl or n-butyl radical, and particularly suitable values for the group —$NR^4R^5$ are the amino, acetamido, N-propylacetamido and n-propylamino radicals.

Specific triazolo-pyrimidine derivatives of the invention are set out in the accompanying examples, and of these, preferred compounds because of their potent activity in preventing bronchospasm are the following derivatives of 5,6-dihydro-5-oxo-s-triazolo[1,5-c]pyrimidine:

2-amino-6,8-di-n-propyl-
2-amino-6-methyl-8-n-propyl-
2-n-propylamino-6,8-di-n-propyl-
2-acetamido-6,8-di-n-propyl- and
2-amino-6-n-propyl-8-n-butyl- A preferred group of compounds of the invention comprises those compounds wherein $R^2$ stands for hydrogen.

According to a further feature of the invention there is provided a process for the manufacture of a triazolo-pyrimidine derivative of the invention which comprises alkylating or aralkylating a compound of the formula:

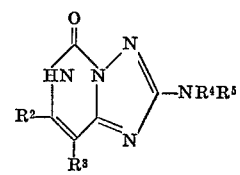

(II)

wherein $R^2$, $R^3$, $R^4$ and $R^5$ have the meanings stated above, with a compound of the formula $R^1Z$, wherein Z stands for a halogen atom or a radical of the formula $O.SO_2.OR^1$ or $O.SO_2Ar$, wherein Ar stands for an aryl radical, or with the corresponding diazoalkane or diazoaralkane.

A particularly suitable value for Z when it stands for a halogen atom is a bromine or iodine atom, and a particularly suitable value for Ar is a phenyl radical optionally bearing a methyl substituent, for example a p-tolyl radical.

The reaction is conveniently carried out in the presence of a base. Such a base may be present in the reaction medium, or it may be added to the compound of Formula II to form a basic derivative before the addition of the compound of the formula $R^1Z$. Preferably such bases are compounds which cause the formation of an alkali metal derivative of the compound of Formula II, for example sodium hydride or potassium hydroxide. The reaction may be carried out at a temperature from 0–150° C. depending upon the reactant used.

According to a further feature of the invention there is provided a process for the manufacture of a triazolo-pyrimidine derivative of the invention wherein $R^4$ stands for a radical of the formula $R^6$.CO—, which comprises reacting a compound of the formula:

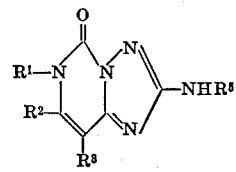

(III)

wherein $R^1$, $R^2$, $R^3$ and $R^5$ have the meanings stated above, with an acylating agent derived from an acid of the formula $R^6$.CO.OH.

A suitable acylating agent is, for example, an acid chloride or anhydride, for example acetic anhydride, or ethyl chloroformate.

According to a further feature of the invention there is provided a process for the manufacture of a triazolo-pyrimidine derivative of the invention wherein $R^5$ stands for an alkyl radical of 1–6 carbon atoms, which comprises reacting a compound of the formula:

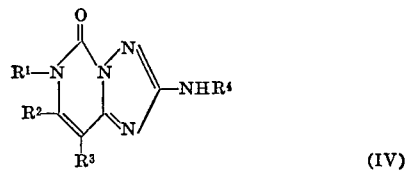

wherein $R^1$, $R^2$, $R^3$ and $R^4$ have the meanings stated above, with an alkylating agent of the formula $R^7Z$, wherein $R^7$ stands for an alkyl radical of 1–6 carbon atoms and Z has the meaning stated above.

This reaction may be carried out under the same conditions as set out above for the reaction of a compound of Formula II with a compound of the formula $R^1Z$. In fact where in the desired product, the actual values of $R^1$ and $R^5$ are the same alkyl radical, the preparation of such a triazolo-pyrimidine derivative of the invention may be carried out by reacting a compound of Formula II wherein $R^5$ stands for hydrogen with at least two molecular equivalents of a compound of the formula $R^7Z$ in the presence of a base. This reaction clearly proceeds by way of a compound of Formula IV as an intermediate and so provides a modification of the above process where the starting material is prepared in situ by reaction of a compound of Formula II, wherein $R^5$ stands for hydrogen, with a compound of the formula $R^7Z$.

According to a further feature of the invention there is provided a process for the manufacture of a triazolo-pyrimidine derivative of the invention wherein $R^4$ stands for a hydrogen atom which comprises hydrolysing a compound of the formula:

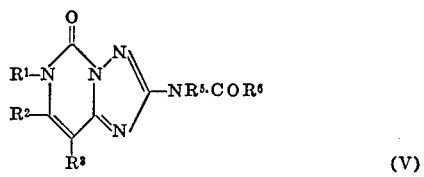

wherein $R^1$, $R^2$, $R^3$, $R^5$ and $R^6$ have the meanings stated above, under acidic conditions.

The hydrolysis may be carried out by the use of a mineral acid, for example hydrochloric acid. The hydrolysis may be carried out at a temperature from 0° C. to 150° C. preferably from 50° C. to 130° C.

The compounds of Formulae II, III, IV and V used as starting materials in the above processes are obtained by methylating a 2-mercapto-4-hydroxypyrimidine of the formula:

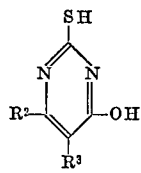

to form the corresponding 2-methylthio derivative which is then treated with phosphorus oxychloride to form the 2-methylthio-4-chloropyrimidine derivative. This latter compound is then treated with hydrazine to form the 2-methylthio-4-hydrazinopyrimidine derivative which is then cyclised with cyanogen bromide in aqueous methylene dichloride in the presence of sodium carbonate to give a 3-amino-5-methylthio-s-triazolo[4,3-c]pyrimidine derivative which is hydrolysed with hydrochloric acid to form a compound of Formula II, wherein $R^4$ and $R^5$ are both hydrogen; rearrangement taking place during the hydrolysis. Alkylation and/or acylation of this compound gives the other compounds of Formula II. The compounds of Formulae III, IV and V are obtained by alkylating the compound of Formula II, wherein $R^4$ and $R^5$ are hydrogen, to give a compound of Formula I, wherein $R^4$ and $R^5$ are hydrogen, which may be further acylated or alkylated as desired.

The activity of the triazolo-pyrimidine derivatives in preventing bronchospasm is demonstrated by their action in preventing the death of guinea-pigs exposed to a histamine aerosol, according to the standard test for such activity. The triazolo-pyrimidine derivatives of this invention are at least as potent in this test as theophylline, and many compounds are more potent. When such compounds are used to treat asthma in humans, a typical dose is from 10 to 200 mg. per man, administered orally or parenterally at intervals as required by the patient depending upon the risk of asthmatic attack. When administered by inhalation, a typical dose is from 1–10 mg./man of a preferred compound.

The triazolo-pyrimidine derivatives of the invention may be administered to patients for the prevention of broncho-spasm in the form of pharmaceutical compositions.

According to a further feature of the invention there is provided a pharmaceutical composition comprising at least one triazolo-pyrimidine derivative of the invention together with a pharmaceutically acceptable diluent or carrier.

The composition may be in a form suitable for oral administration, for example a tablet, capsule, syrup or linctus, or it may be in a form suitable for parenteral administration, for example a sterile injectionable aqueous or oily solution or suspension, or it may be in a form suitable for inhalation, for example an aerosol. A preferred composition for use in preventing bronchospasm in an orally administrable composition containing from 5 to 50 mg. of triazolo-pyrimidine derivative.

When used to prevent bronchospasm, the triazolo-pyrimidine derivatives of the invention may be adminstered together with other compounds which are known to prevent bronchospasm. Such other compounds are, for example, aminophylline which is administered orally or by injection, sympathomimetic amines which are administered orally or as aerosols depending upon the actual amine in question, or those corticosteroids which are used to control asthma, for example prednisolone.

The concurrent administration of a triazolo-pyrimidine derivative of the invention together with a sympathomimetic amine is particularly useful because the action of the sympathomimetic amine is potentiated by the triazolo-pyrimidine so that the effect of a combination of both drugs is greater than the sum of the effects of the individual components. The sympathomimetic amine and triazolo-pyrimidine may be administered as a pharmaceutical containing both components, or they may be administered separately. Thus when the sympathomimetic amine is only effective by inhalation, for example adrenaline or isoprenaline, the active ingredients may be administered by the use of an aerosol containing both components. When the sympathomimetic amine is effective by oral or parenteral administration, the active ingredients may be administered by the use of a pharmaceutical composition containing both components, for example a tablet, capsule, solution or suspension. A preferred sympathomimetic amine which is effective on oral administration and which exerts a much more pronounced effect upon bronchial muscle than upon cardiac muscle is a 2-amino-1-phenylethanol derivative of the formula:

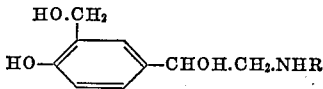

wherein R is a branched-chain alkyl radical of up to 6 carbon atoms, especially a t-butyl radical.

The triazolo-pyrimidine derivatives of the invention may also be administered together with a β-adrenergic blocking agent, for example 1-(4-acetamidophenoxy)-3-isopropylamino-2-propanol, which will inhibit any sympathomimetic action of the triazolo-pyrimidine derivative on the heart, but not affect the action of the triazolo-pyrimidine on the bronchial musculature.

The invention is illustrated but not limited by the following examples.

EXAMPLE 1

A mixture of 2-amino-5-hydroxy-8-n-propyl-s-triazolo-[1,5-c]pyrimidine (2.4 g.), sodium hydride [0.58 g.— weighed as a 50% dispersion in oil, but subsequently washed free from oil by decantation with light petroleum] and dry dimethylformamide (20 ml.) was stirred for 30 minutes. Methyl iodide (3.3 g.) was then added slowly to the stirred suspension, which was kept at 25–30° C. and stirred for a further 1 hour. The mixture was filtered, and the solid washed, dried and recrystallised from methanol to give 2 - amino-5,6-dihydro-6-methyl-5-oxo-8-n-propyl-s-triazolo[1,5-c]pyrimidine, M.P. 216–217° C.

The 2-amino - 5 - hydroxy-8-n-propyl-s-triazolo[1,5-c]-pyrimidine used as starting material is obtained by the following reaction sequence in which the reaction conditions are those which are conventionally used in pyrimidine chemistry.

4-hydroxy-2-mercapto-5-n-propylpyrimidine was boiled with methyl iodide in ethanol containing sodium ethoxide, and the product crystallised from 50% v./v. aqueous ethanol to give 4-hydroxy-2-methylthio-5-n-propylpyrimidine, M.P. 146–148° C. This product was heated under reflux for 2 hours with phosphorous oxychloride to give 4 - chloro-2-methylthio-5-n-propylpyrimidine, B.P. 112–113° C./2 mm., which was heated under reflux with hydrazine hydrate in ethanol for 3 hours. The resulting 4-hydrazino-2-methylthio-5-n-propylpyrimidine, M.P. 105–107° C., was recrystallised from cyclohexane, and then treated with a 10% excess of cyanogen bromide in the presence of an excess of aqueous sodium carbonate and methylene chloride at room temperature to give 3-amino-5 - methylthio-8-n-propyl - s - triazolo[4,3-c]pyrimidine, M.P. 166–167° C., recrystallised from ethanol. This latter s-triazolo[4,3-c]pyrimidine derivative was heated at 100° C. for 30 minutes with aqueous 2 N-hydrochloric acid to form 2-amino-5-hydroxy-8-n-propyl-s-triazolo[1,5-c]pyrimidine, M.P. 298–299° C. (decomposition), recrystallised from dimethylformamide.

EXAMPLE 2

A mixture of 2 - amino-5-hydroxy-8-methyl-s-triazolo-[1,5-c]pyrimidine (2.48 g.), sodium hydride [0.72 g.— weighed as a 50% dispersion in oil and subsequently washed free from oil by decantation with light petroleum] and dry dimethylformamide (25 ml.) was stirred for 30 minutes. n-Propyl iodide (7.5 g.) was then added slowly to the stirred suspension, which was kept at 25–30° C., and stirred for a further 1 hour. The mixture was filtered, and the solid washed, dried and recrystallised from dimethylformamide to give 2-amino-5,6-dihydro-8-methyl-5 - oxo-6-n-propyl-s-triazolo[1,5-c]pyrimidine, M.P. 257–258° C.

The 2-amino - 5 - hydroxy-8-methyl-s-triazolo[1,5-c]pyrimidine used as starting material is obtained by a reaction sequence strictly analogous to that described in Example 1 for the preparation of 2-amino-5-hydroxy-8-n-propyl-s-triazolo[1,5-c]pyrimidine. Novel compounds prepared in this sequence were:

4-hydrazino-5-methyl-2-methylthiopyrimidine, M.P. 155–156° C.
3-amino-8-methyl-5-methylthio-s-triazolo[4,3-c]-pyrimidine, M.P. 217–218° C.
2-amino-5-hydroxy-8-methyl-s-triazolo[1,5-c]-pyrimidine, M.P. 361–363° C.

EXAMPLE 3

The process of Example 2 was repeated except that the n-propyl iodide was added to the stirred suspension at 90° C. The product, 2-amino-5,6-dihydro-8-methyl-5-oxo-6-n-propyl-s-triazolo[1,5-c]pyrimidine, M.P. 257–258° C. was isolated in higher yield than in Example 2.

EXAMPLE 4

The general procedure described in Example 1 was repeated using a 2-amino-5-hydroxy-8-alkyl - s - triazolo-[1,5-c]pyrimidine derivative as starting material, and alkylating this with either methyl iodide at 25–30° C. or n-propyl iodide at 75–100° C. In this way the following compounds were obtained:

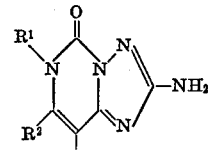

| No. | R¹ | R² | R³ | Recrystallisation solvent | M.P. ° C |
|---|---|---|---|---|---|
| 1 | n.Pr | H | n.Pr | Ethanol | 165–166 |
| 2 | Me | H | Me | Dimethylformamide | 319–321 |
| 3 | n.Pr | H | Et | Ethanol | 196–191 |
| 4 | n.Pr | H | n.Bu | do | 173–175 |
| 5 | Me | H | n.Bu | Methanol | 182–187 |
| 6 | n.Pr | Me | n.Pr | Ethanol | 249–253 |
| 7 | Me | Me | n.Pr | Methanol | 249–250 |

The starting material used in the preparation of compounds Nos. 1 and 2 above was prepared as described in Examples 1 and 2 respectively.

The starting materials used in the preparation of compounds 3–7 above were prepared by a reaction sequence strictly analogous to that described in Example 1 for the preparation of 2-amino-5-hydroxy-8 - n - propyl - s - triazolo[1,5-c]pyrimidine. Novel compounds prepared in these sequences were:

(a) In respect of compound No. 3:

5-ethyl-4-hydroxy-2-methylthiopyrimidine, M.P. 185–186° C.
4-chloro-5-ethyl-2-methylthiopyrimidine, B.P. 130–140° C./10–12 mm.
5-ethyl-4-hydrazino-2-methylthiopyrimidine, M.P. 138–139° C.
3-amino-8-ethyl-5-methylthio-s-triazolo[4,3-c]pyrimidine, M.P. 179–180° C.
2-amino-8-ethyl-5-hydroxy-s-triazolo[1,5-c]pyrimidine, M.P. 335–336° C. (dec.)

(b) In respect of compounds Nos. 4 and 5:

5-n-butyl-4-hydroxy-2-methylthiopyrimidine, M.P. 138–140° C.
5-n-butyl-4-chloro-2-methylthiopyrimidine, B.P. 163–165° C./12 mm.
5-n-butyl-4-hydrazino-2-methylthiopyrimidine, M.P. 119–120° C.
3-amino-8-n-butyl-5-methylthio-s-triazolo[4,3-c] pyrimidine, M.P. 163–164° C.
2-amino-8-n-butyl-5-hydroxy-s-triazolo[1,5-c]pyrimidine, M.P. 302–303° C. (dec.)

(c) In respect of compounds Nos. 6 and 7:

4-chloro-6-methyl-2-methylthio-5-n-propylpyrimidine, B.P. 131–133° C./3.5 mm.
4-hydrazino-6-methyl-2-methylthio-5-n-propylpyrimidine, M.P. 122–123° C.
3-amino-7-methyl-5-methylthio-8-n-propyl-s-triazolo-[4,3-c]pyrimidine, M.P. 210–212° C. (dec.)
2-amino-5-hydroxy-7-methyl-8-n-propyl-s-triazolo-[1,5-c]pyrimidine, M.P. 314–316° C. (dec.)

EXAMPLE 5

A mixture of 2-amino-5-hydroxy - 8 - n - propyl - s-triazolo-[1,5 - c]pyrimidine (1.92 g.), sodium hydride (0.48 g.—weighed as a 50% dispersion in oil and washed as in Example 1), and dry dimethylformamide (20 ml.) was stirred for 30 minutes. A solution of benzyl bromide (3.42 g.) in dimethylformamide (5 ml.) was added, and the resultant solution was left to stand at ambient temperature for 18 hours. It was then evaporated under reduced pressure, and the residual oil was triturated with a mixture of water (10 ml.) and chloroform (20 ml.). The chloroform layer was separated, dried over anhydrous sodium sulphate, and the solvent was distilled off to leave an oily solid. This was purified by chromatography on an alumina column, eluting successively with hexane, ethyl acetate, and ethanol. By evaporation of the ethanolic eluate, and recrystallisation of the residue from n-propanol, there was obtained 2-amino-6-benzyl-5,6-dihydro-5-oxo-8-n-propyl-s - triazolo[1,5 - c]pyrimidine of M.P. 197–199° C.

EXAMPLE 6

A mixture of 2-amino-5,6-dihydro-5-oxo - 6,8 - di - n-propyl-s-triazolo[1,5-c]pyrimidine (1.18 g.), acetic anhydride (5 ml.) and acetic acid (5 ml.) was boiled under reflux for 2½ hours. The solution was evaporated, and the residue was treated with aqueous 10% potassium hydroxide and chloroform. The chloroform extract was washed with water, dried over anhydrous sodium sulphate, and evaporated to yield an oil from which crystals slowly separated. These were recrystallised from ethanol to give 2-acetamido-5,6-dihydro-5-oxo-6,8-di-n-propyl-s-triazolo[1,5-c]pyrimidine of M.P. 161–163° C.

EXAMPLE 7

A mixture of 2-acetamido-5-hydroxy-8-n-propyl-s-triazolo[1,5-c]pyrimidine (0.85 g.), sodium hydride (0.17 g.—weighed as a 50% dispersion in oil and washed as in Example 1), and dry dimethylformamide (10 ml.) was stirred for 30 minutes. n-Propyl bromide (0.89 g.) was added and the mixture was stirred and heated to 100° C. for 5 minutes. The mixture was then evaporated under reduced pressure and the residual oil was triturated with water (10 ml.) and extracted with chloroform. The chloroform extract was washed with water, dried over anhydrous sodium sulphate, and evaporated to give an oil which deposited a solid when stirred with cyclohexane (40 ml.). Recrystallisation of the solid from ethyl acetate gave 2-acetamido-5,6-dihydro-5-oxo-6,8-di-n-propyl-s-triazolo[1,5-c]pyrimidine of M.P. 163–165° C. and identical with material prepared as in Example 6.

The 2-acetamido - 5 - hydroxy - 8 - n - propyl-s-triazolo [1,5-c]pyrimidine used in this preparation was obtained by boiling 2-amino-5-hydroxy-8-n-propyl-s-triazolo[1,5-c] pyrimidine with a 1:1 mixture of acetic anhydride and acetic acid. It was recrystallised from acetic acid, and melted with decomposition at 329–331° C.

EXAMPLE 8

2-acetamido-5,6-dihydro - 5 - oxo-6,8-di-n-propyl-s-triazolo[1,5-c]pyrimidine (0.55 g.) was added to a suspension of sodium hydride (0.1 g.—weighed as a 50% dispersion in oil and washed as in Example 1) in dimethylformamide (10 ml.). The mixture was stirred for 30 minutes and then n-propyl iodide (0.68 g.) was added. The whole was stirred for a further 2 hours and evaporated under reduced pressure. Upon trituration with water (10 ml.), the residue gave a solid which, after crystallisation from cyclohexane, yielded 2 - N - propylacetamido - 5,6 - dihydro - 5 - oxo-6,8-di-n-propyl - s - triazolo [1,5-c]pyrimidine, M.P. 87–87.5° C.

EXAMPLE 9

A mixture of 2-acetamido - 5 - hydroxy-8-n-propyl-s-triazolo[1,5-c]pyrimidine (1.06 g.), sodium hydride (0.43 g.—weighed as a 50% dispersion in oil and washed as in Example 1), and dry dimethylformamide (15 ml.) was stirred for 30 minutes. n-Propyl iodide (3.06 g.) was added, and the mixture was stirred at 95° C. for 15 minutes. The solution was evaporated to dryness under reduced pressure, and the residual solid was washed with water and dried. Recrystallisation from cyclohexane gave 2-N-propylacetamido-5,6-dihydro - 5 - oxo-6,8-di-n-propyl-s-triazolo[1,5-c]pyrimidine of M.P. 87–87.5° C. undepressed on admixture with material prepared according to Example 8.

EXAMPLE 10

2-N-propylacetamido-5,6-dihydro - 5 - oxo-6,8-di-n-propyl-s-triazolo[1,5-c]pyrimidine (0.65 g.) was boiled under reflux with 5 N-hydrochloric acid (10 ml.) for 30 minutes. The resultant solution was cooled, clarified by filtration, and brought to pH 7 by addition of sodium carbonate. The precipitated solid was collected, washed with water, dried, and recrystallised from cyclohexane to give 5,6 - dihydro - 5 - oxo-6,8-di-n-propyl-2-n-propylamino-s-triazolo[1,5-c]pyrimidine of M.P. 137–138° C.

EXAMPLE 11

Pharmaceutical compositions containing an s-triazolo [1,5-c]pyrimidine derivative may be prepared from any s-triazolo[1,5-c]pyrimidine derivative of the invention as illustrated in the foregoing examples by conventional procedures as illustrated below in which the active ingredient is named as 2-amino-5,6-dihydro-5-oxo-6,8-di-n-propyl-s-triazolo[1,5-c]pyrimidine, but in which it is to be understood that the amount of this particular active ingredient may be replaced by an equipotent amount of any other illustrated s-triazolo[1,5-c]pyrimidine derivative of the invention.

Aerosol

An aerosol which contains the active ingredients can be prepared as follows whereby the figures given relate to a single measured dose:

| | |
|---|---|
| 2-amino - 5,6 - dihydro - 5 - oxo-6,8-di-n-propyl-s-triazolo[1,5-c]pyrimidine | mg.   1 |
| Oleic acid | µg.  10 |
| Dichlorodifluoromethane | mg.  61 |
| Trichlorofluoromethane | mg.  24 |

The active ingredient, the oleic acid and a portion of the dichlorodifluoromethane are mixed. The suspension is then diluted with the rest of the dichlorodifluoromethane and the required amount is placed into aluminium aerosol containers which are sealed by a suitable measuring valve. The containers are then brought under pressure with the trichlorofluoromethane.

Tablet (a) An intimate mixture of 2-amino-5,6-dihydro-5-oxo-6,8-di-n-propyl-s-triazolo[1,5-c]pyrimidine (4.5% by weight), maize starch (31% by weight), calcium phosphate (63% by weight) and magnesium stearate (0.5% by weight) is compressed, and the compressed mixture is then broken down into granules by passage through a 16-mesh screen. The resultant granules are then compressed into tablets which may contain 10 mg. of of the active ingredient. There are thus obtained tablets suitable for oral use for therapeutic purposes.

(b) An intimate mixture of 2-amino-5,6-dihydro-5-oxo-6,8-di-n-propyl-s-triazolo[1,5-c]pyrimidine (2.5% by weight), granular mannitol (95.5% by weight), magnesium stearate (1% by weight) and stearic acid (1% by weight) is compressed into tablets which may contain 5 mg. of the active ingredient. There are thus obtained soluble tablets suitable for administering under the tongue.

What we claim is:

1. A triazolo-pyrimidine of the formula:

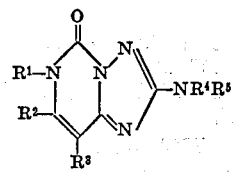

wherein $R^1$ is alkyl of 1–6 carbon atoms or phenylalkyl of up to 10 carbon atoms, $R^2$ is hydrogen or alkyl of 1–3 carbon atoms, $R^3$ is alkyl of 1–6 carbon atoms, $R^4$ is hydrogen or $R^6 \cdot CO-$, wherein $R^6$ is alkyl of 1–4 carbon atoms, and $R^5$ is hydrogen or alkyl of 1–6 carbon atoms.

2. A triazolo-pyrimidine according to claim 1 wherein $R^1$ is methyl, n-propyl or benzyl, $R^2$ is hydrogen, $R^3$ is methyl, ethyl, n-propyl or n-butyl, and the group —$NR^4R^5$ is amino, acetamido, N-propylacetamido or n-propylamino.

3. A triazolo-pyrimidine according to claim 1 which is 2-amino-5,6-dihydro - 5 - oxo-6,8-di-n-propyl-s-triazolo[1,5-c]pyrimidine.

4. A triazolo-pyrimidine according to claim 1 which is 2-amino-5,6-dihydro - 6 - methyl - 5 - oxo-8-n-propyl-s-triazolo[1,5-c]pyrimidine.

5. A triazolo-pyrimidine according to claim 1 which is 2-n-propylamino-5,6-dihydro - 5 - oxo-6,8-di-n-propyl-s-triazolo[1,5-c]pyrimidine.

6. A triazolo-pyrimidine according to claim 1 which is 2-acetamido-5,6-dihydro - 5 - oxo-6,8-di-n-propyl-s-triazolo[1,5-c]pyrimidine.

7. A triazolo-pyrimidine according to claim 1 which is 2-amino-8-n-butyl-5,6-dihydro-5-oxo - 6 - n - propyl-s-triazolo[1,5-c]pyrimidine.

References Cited
UNITED STATES PATENTS 3,046,276  7/1962  Miller et al. _____ 260—256.4

DONALD G. DAUS, Primary Examiner

R. V. RUSH, Assistant Examiner

U.S. Cl. X.R.

424—251